United States Patent [19]
Welsh

[11] 3,827,521
[45] Aug. 6, 1974

[54] SPARE TIRE ENCLOSURE
[76] Inventor: Emery H. Welsh, 3390 E. Cook Rd., Grand Blanc, Mich. 48439
[22] Filed: Oct. 30, 1972
[21] Appl. No.: 302,261

[52] U.S. Cl. ................ 180/54 A, 138/103, 165/44, 224/42.06, 224/42.2
[51] Int. Cl. ........................................... B60k 11/02
[58] Field of Search .... 180/68 P, 68 R, 54 A, 69 R, 180/1 R; 224/42.12, 42.13, 42.14, 42.2, 42.26, 42.27, 42.28, 42.29, 42.3, 42.01, 42.06, 42.04; 296/37.2; 165/44; 62/241; 138/103, 106

[56] References Cited
UNITED STATES PATENTS
1,336,757  4/1920  Raffelson ...................... 224/42.2 X
1,891,727  12/1932  Ramsay et al. ................ 224/42.2 X
2,871,968  2/1959  Giacosa ......................... 296/37.2 X FOREIGN PATENTS OR APPLICATIONS
347,314  1/1922  Germany ........................... 180/68 R

*Primary Examiner*—David Schonberg
*Assistant Examiner*—Milton L. Smith
*Attorney, Agent, or Firm*—Harness, Dickey & Pierce

[57] ABSTRACT

A spare tire enclosure for a spare tire mounted in front of the radiator of a vehicle. Ducts on the enclosure are directed toward the radiator.

8 Claims, 2 Drawing Figures

PATENTED AUG 6 1974          3,827,521

SPARE TIRE ENCLOSURE

BACKGROUND AND SUMMARY OF THE INVENTION

The present invention pertains to a spare tire enclosure for a spare tire mounted in front of the radiator of a vehicle.

In certain types of vehicles, for example camper vehicles, it is often desirable to mount the spare tire in front of the vehicle grille. Since the radiator is customarily positioned directly behind the grille, the front-mounted spare tire interferes with air flow through the grille to the radiator, and can reduce the cooling capability of the radiator.

An important object of the present invention is to minimize the effect on the vehicle cooling system of mounting the spare tire in front of the radiator.

A further object of the invention is to provide a spare tire enclosure for a front-mounted spare tire which tends to direct air flow around the spare tire toward the radiator.

Other objects of the invention are to provide a spare tire enclosure in accordance with the preceding objects which can be economically constructed in various forms to accommodate different installation requirements; which can provide a decorative appearance; and which provides convenient access to the spare tire.

The foregoing as well as additional objects and advantages of the invention will be seen in the ensuing description and claims which are to be taken in conjunction with the accompanying drawing.

BRIEF DESCRIPTION OF THE DRAWING

The drawing illustrates a preferred embodiment of the invention in accordance with the best mode presently contemplated for carrying out the invention.

DESCRIPTION OF THE PREFERRED EMBODIMENT

Figure 1:
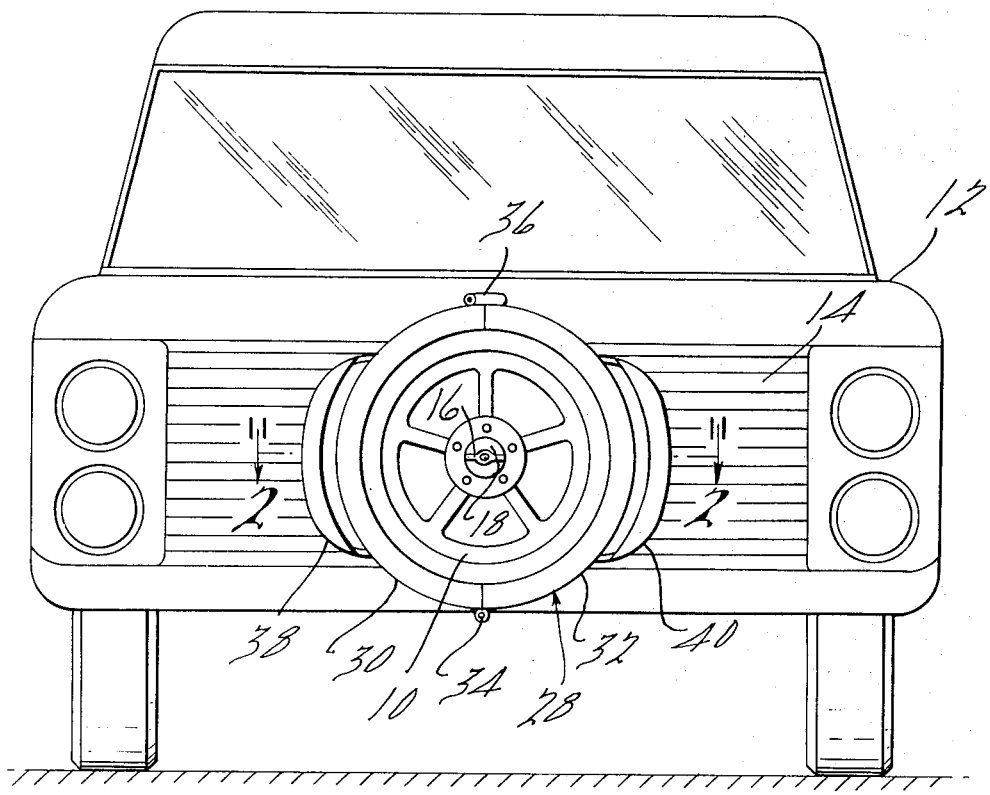
FIG. 1 is a front view of a vehicle showing a spare tire enclosure according to the present invention.

Turning now to the drawing, a spare tire 10 is removably mounted on a vehicle 12 directly in front of a grille 14. Spare tire 10 is secured by means of a wing nut 16 and a washer 18 to a bolt 20 rigidly and sturdily affixed to the vehicle as at 22. A radiator 24 is positioned directly behind grille 14 and an engine fan 26 directly behind radiator 24. Absent spare tire 10, the entire frontal area of radiator 24 is exposed via grille 14 so that cooling air can flow through the radiator across its entire frontal area. However, with spare tire 10 mounted in front of grille 14, air flow through radiator 24 is somewhat obstructed and this can result in loss of radiator cooling capacity.

Figure 2:
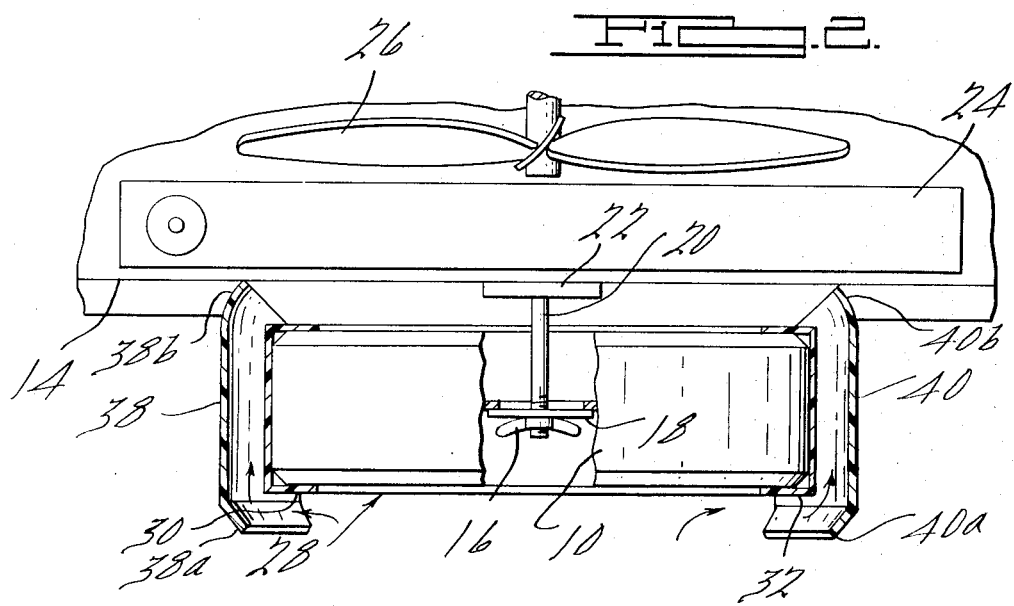
FIG. 2 is an enlarged horizontal sectional view taken along line 2–2 in FIG. 1.

For the purpose of alleviating the adverse effect on the vehicle cooling system created by the front-mounted spare tire, a spare tire enclosure 28 according to the present invention is mounted on spare tire 10. Enclosure 28 comprises a pair of symmetrical semicircular enclosure elements 30 and 32. The adjacent lower ends of elements 30 and 32 are hinged together as at 34 to permit enclosure 28 to open and close on tire 10. With enclosure 28 closed on tire 10, the adjacent upper ends of elements 30 and 32 are latched as at 36. The portions of elements 30 and 32 which girdle the tread of tire 10 have a radial cross section in the shape of a radially inwardly facing channel (FIG. 2). Thus, with enclosure 28 closed and latched on spare tire 10, enclosure 28 is securely mounted in front of grille 14.

A pair of air ducts 38 and 40 are fashioned on elements 30 and 32, respectively, and lie on diametrically opposite sides of enclosure 28. Ducts 38 and 40 extend axially from front to rear of enclosure 28. The axially rearward portions 38b and 40b of the respective ducts are curved inwardly toward the portion of radiator 24 which lies directly behind spare tire 10. The forward portions 38a and 40a of the respective ducts extend axially forwardly and radially inwardly of elements 30 and 32. Portions 38a and 40a tend to capture air which might otherwise not enter ducts 38 and 40. Thus, the illustrated arrangement of the ducts provides a "scooping" effect with a resulting tendency of the air flow through the ducts toward radiator 24 to increase. The arcuate extent of each duct is generally coextensive with the height of grille 14 and hence, approximately the height of radiator 24. Because the two halves of enclosure 28 are symmetrical, they may be advantageously formed from the same die.

When vehicle 12 is operated with enclosure 28 mounted on spare tire 10, ducts 38 and 40 direct air flow toward the central portions of radiator 24 which lie directly behind spare tire 10. Thus, enclosure 28 tends to alleviate the adverse affect on the vehicle cooling system occasioned by mounting spare tire 10 in front of radiator 24.

While the preferred embodiment is advantageous in that a minimal amount of material is utilized in constructing enclosure 28, it will be appreciated that the enclosure may be constructed in a variety of ways. For example, a circular cover (which is omitted from the drawing for sake of clarity in illustrating the spare tire mounting arrangement) could be positioned over enclosure 28 to conceal the attachment arrangement. If desired, the cover could include means for mounting the license plate thereon so that the license plate would be positioned at the center of the enclosure. Alternatively, elements 30 and 32 could themselves be formed to conceal the attachment arrangement. It is also possible to construct enclosure 28 to accommodate various sizes of tires. This can be done by dimensioning enclosure 28 to the largest size tire both in diameter and width and making the unhinged ends of elements 30 and 32 increasingly telescopically engageable with each other to snugly fit around tires of decreasing diameter.

The enclosure of the invention can be constructed from a variety of materials; for example, sheet metal, fiber glass or plastic are suitable. A molded fiber glass or plastic enclosure is particularly advantageous for at least several reasons. Ducts 38 and 40 can be integrally formed on enclosure elements 30 and 32. Furthermore, any desired decorative appearance may be easily incorporated in the mold to produce a matching decorative appearance in the finished enclosure. Also the molded enclosure may be integrally colored to any desired color by the usual technique, and this renders the finished enclosure highly immune to loss of color when struck by flying stones or gravel. It is also not necessary that the spare tire enclosure be mounted on the vehicle via the spare tire. Accordingly, the spare tire enclosure may be constructed for mounting on the vehicle with the spare tire being mounted on the vehicle via the spare tire enclosure. Thus, so long as the enclosure is sturdily mounted on the vehicle to provide proper orientation of ducts 38 and 40, it may be constructed in any one of a wide variety of ways to meet the requirements for individual vehicles.

I claim:

1. A spare tire enclosure for a spare tire positioned in front of the radiator of a vehicle, said enclosure comprising a tire girdling portion girdling the tire and supported thereon and duct means on said tire girdling portion directed toward the radiator with the enclosure mounted on the tire.

2. The enclosure of claim 1 wherein said duct means comprises a pair of ducts on diametrically opposite sides of said tire girdling portion.

3. The enclosure of claim 2 wherein said ducts are symmetrical about the axis of the enclosure.

4. The enclosure of claim 2 wherein said ducts are curved inwardly at the rear ends thereof toward the radiator.

5. The enclosure of claim 2 wherein portions of the outer periphery of said tire girdling portion form the inner walls of said ducts.

6. The enclosure of claim 5 wherein the outer walls of said ducts comprise concave walls facing radially inwardly of the enclosure.

7. The enclosure of claim 6 wherein the arcuate extent of each of said outer walls is approximately coextensive with the height of the radiator.

8. The enclosure of claim 2 wherein the forward portion of each duct is directed radially inwardly and axially forwardly of said tire girdling portion.

* * * * *